US010661216B2

(12) United States Patent
Franoschek

(10) Patent No.: US 10,661,216 B2
(45) Date of Patent: May 26, 2020

(54) SOOT PARTICLE FILTER WITH STORAGE CELLS FOR A CATALYST

(71) Applicant: UMICORE AG & CO. KG, Hanau-Wolfgang (DE)

(72) Inventor: Stefan Franoschek, Nettetal (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/480,440

(22) PCT Filed: Jan. 29, 2018

(86) PCT No.: PCT/EP2018/052167
§ 371 (c)(1),
(2) Date: Jul. 24, 2019

(87) PCT Pub. No.: WO2018/149627
PCT Pub. Date: Aug. 23, 2018

(65) Prior Publication Data
US 2020/0030735 A1  Jan. 30, 2020

(30) Foreign Application Priority Data
Feb. 17, 2017 (DE) .................. 10 2017 103 341

(51) Int. Cl.
*B01D 46/00* (2006.01)
*B01D 46/24* (2006.01)
*B01D 53/94* (2006.01)
*F01N 3/035* (2006.01)

(52) U.S. Cl.
CPC ..... *B01D 46/2459* (2013.01); *B01D 46/0027* (2013.01); *B01D 46/247* (2013.01); *B01D 46/2429* (2013.01); *B01D 53/94* (2013.01); *F01N 3/035* (2013.01); *B01D 2046/2437* (2013.01); *B01D 2046/2477* (2013.01); *B01D 2046/2481* (2013.01); *B01D 2046/2492* (2013.01); *B01D 2255/9155* (2013.01); *B01D 2279/30* (2013.01)

(58) Field of Classification Search
CPC .. B01D 37/025; B01D 46/00; B01D 46/0005; B01D 46/2418; B01D 46/2492; B01D 53/94; B01D 2258/012; F01N 3/021; F01N 3/0222; F01N 3/035; F01N 3/0821; F01N 3/2842; F01N 2250/02; F01N 2330/30
See application file for complete search history.

(56) References Cited

U.S. PATENT DOCUMENTS

| 7,384,442 | B2 * | 6/2008 | Bardhan | B01D 39/2093 264/628 |
| 7,596,943 | B2 * | 10/2009 | Son | B01D 46/006 422/168 |
| 2008/0286166 | A1 | 11/2008 | Heidenreich | |

FOREIGN PATENT DOCUMENTS

| DE | 10 2008 022479 A1 | 3/2009 |
| EP | 1 108 865 A2 | 6/2001 |
| EP | 1 776 994 A1 | 4/2007 |
| EP | 2 065 576 A1 | 6/2009 |
| EP | 1 642 012 B1 | 5/2010 |
| FR | 2907158 A1 | 4/2008 |
| WO | 2565/016497 A1 | 2/2005 |

OTHER PUBLICATIONS

International Preliminary Report on Patentability dated Aug. 20, 2019 for International Patent Application No. PCT/EP2018/052167 (6 pages in German with English translation).
Van Setten, B.A.A.L. et al., Science and Technology of Catalytic Diesel Particulate Filters. Catalysis Reviews. 2001. vol. 43(4), pp. 489-564.
Majewski, W. A. Wall-Flow Monoliths. DieselNet Technology Guide. Ecopoint Inc. Revision 2005.09b (36 pages).
International Search Report for PCT/EP2018/052167, dated Jun. 18, 2018 (4 pgs. with English translation).
Written Opinion of the International Searching Authority for PCT/EP2018/052167, dated Jun. 18, 2018 (5 pgs.).

* cited by examiner

Primary Examiner — Timothy C Vanoy
(74) Attorney, Agent, or Firm — Smith, Gambrell & Russell, LLP

(57) ABSTRACT

The invention relates to a wall-flow filter for cleaning exhaust gases from engines, with parallel exhaust gas inlet channels and exhaust gas outlet channels which are closed at alternate ends, said filter additionally comprising catalyst channels which are closed at both ends and contain a catalyst in solid form. The invention also relates to production methods and uses of the filter for cleaning exhaust gases, particularly from diesel engines.

13 Claims, 3 Drawing Sheets

SOOT PARTICLE FILTER WITH STORAGE CELLS FOR A CATALYST

The invention relates to wall-flow filters for cleaning exhaust gases from engines, having parallel exhaust gas inlet channels and exhaust gas outlet channels which are closed at alternate ends, wherein the filter additionally comprises catalyst channels which are closed at both ends and contain a catalyst in solid form. The invention also relates to production methods and uses of the filters for cleaning exhaust gases.

PRIOR ART

Particle filters serve to reduce the particles present in the exhaust gas of engines. Particle filters are used in particular for filtering the exhaust gases of diesel engines and are referred to as diesel particulate filters (DPF) or soot particle filters (SPF). Soot particle filters can be designed according to two different ways of functioning which are basically different. While the exhaust gases pass through a porous wall in the filter in the case of wall-flow filters, the exhaust gases flow through the filters and are cleaned at its inner surface in the case of flow filters.

Wall-flow filters have a structure consisting of parallel channels with porous walls which are closed at alternate ends. The porous filter walls are generally made of ceramics or of metals. The exhaust gases enter inlet channels closed at the ends and flow through the porous walls, as a result of which they pass into outlet channels closed at the front end and are released from there into the environment. The solid components, in particular the soot particles, are filtered by the porous walls. In the case of surface filters, the particles collect mainly on the surface of the filter wall or, in the case of depth filtration, accumulate in the interior of the filter wall.

In the case of the wall-flow filters customary in the prior art, the porous walls are provided with catalytic coatings. These catalytic coatings support the depletion of undesired exhaust gas components by means of chemical reactions. The catalysts serve in particular for the depletion of undesired gaseous exhaust gas components, such as nitrogen oxides (NOx), CO, hydrocarbons or $H_2S$. Comparatively harmless products are obtained thereby, such as $H_2O$, $CO_2$ or $N_2$. The catalysts may also remove solid components or aid their degradation, for example, by the reaction of soot to $CO_2$. The catalytic coatings usually contain metals and metal oxides, in particular noble metals or transition group metals, such as platinum, palladium, rhodium, nickel, cobalt, molybdenum, tungsten, cerium, copper, vanadium, iron, gold or silver. In the prior art, coatings with storage materials which can store undesired gaseous components are also known. The general function of such filters and the underlying chemical and physical processes are described, for example, in van Settens et al., "Science and Technology of Catalytic Diesel Particulate Filters," 2001, Catalysis Reviews 43(4), 489-564. Catalyst-coated wall-flow filters and methods for their production are described, for example, in WO 2005/016497A1.

However, such coated soot particle filters are still in need of improvement. There is thus an ongoing need for efficient wall-flow filters that make a high gas flow possible, achieve a good filter effect while efficiently removing further unwanted components through catalytic reaction and at the same time have a compact and stable structure.

In order to maintain an adequate flow of exhaust gas and in the process achieve a sufficient filter effect, the coatings must have a defined porosity which is precisely matched to that of the porous walls. For this reason, the catalytic coatings of conventional wall-flow filters must regularly have only a limited thickness. Otherwise, too high a back-pressure would arise during normal operation. Due to the low thickness of the coating, which in addition is porous, the filter can only be provided with a limited amount of catalytically active material. Since such standard components, in particular for motor vehicles, must be compact in order to enable space-saving installation and to increase weight as little as possible, this cannot be compensated simply by enlarging the filter.

Wall-flow filters whose channel walls have a high porosity are therefore used in the prior art. EP 1 776 994 A1 accordingly proposes methods for providing catalytic coatings with a defined porosity. However, it is disadvantageous in this case that both the soot filtering efficiency and mechanical stability decrease with the porosity.

There is therefore still an ongoing need for compact filters containing large quantities of catalytically active material but also nevertheless having good filtration properties and being compact and mechanically stable.

A further disadvantage of conventional wall-flow filters is that the methods for their production are relatively complicated. Such filters are usually produced by sucking liquid solutions and suspensions of the catalyst components (wash coat) into the filters under reduced pressure. In this case, it is challenging to achieve a uniform coating inside the filter for different catalytic materials and to precisely adjust the required porosity of the coating at the same time. For this reason, such catalytic coatings can only be produced in complex processes, wherein the individual steps, such as wash-coat preparation, coating under reduced pressure, drying and calcining must be precisely controlled and are relatively prone to failure. It would therefore be desirable to provide simplified methods for producing wall-flow filters.

AIM OF THE INVENTION

The invention is based upon the aim of providing wall-flow filters with catalysts which overcome the above-described disadvantages of the prior art. According to the invention, improved wall-flow filters are to be provided which have a high catalytic activity. In this case, the catalysts should have good filter properties and a high mechanical stability and make possible high gas flow in a compact design.

The invention is in addition based upon the aim of providing simplified methods for producing wall-flow filters. The methods are to avoid the disadvantages of known coating methods which are caused inter alia by the required precise control of porosity and the limited thickness of the coatings. According to the invention it should be possible without particular effort as regards requirements to use, vary or combine different catalyst materials in the quantities desired.

DISCLOSURE OF THE INVENTION

Surprisingly, the aim upon which the invention is based is achieved by a wall-flow filter and method according to the claims. Further advantageous embodiments are explained in the description.

The invention relates to a wall-flow filter for cleaning exhaust gases from engines, comprising parallel exhaust gas inlet channels and exhaust gas outlet channels which are closed at alternate ends, wherein the filter additionally comprises catalyst channels which are closed at both ends and which contain the catalyst in solid form and the inlet channels and the catalyst channels have common walls and the outlet channels and the catalyst channels likewise have common walls. The latter are closed at both ends, that is at the front end (exhaust gas inlet end) and at the back end (exhaust gas outlet end). As a result, the catalyst is enclosed in the catalyst channels.

The basic structure of the wall-flow filter according to the invention consisting of parallel exhaust gas inlet channels and exhaust gas outlet channels closed at alternate ends is also referred to in the prior art as a "honeycomb" structure or "monolith." The filter consists essentially of parallel channels connecting the inlet end to the outlet end. The channels generally have a homogeneous cross-section and porous walls. The exhaust gases flow from the engine into the inlet channels, which are open at the front end and closed at the back end. The exhaust gases then flow through the porous walls of the inlet channels into the outlet channels, which are closed at the front end, and finally escape through the outlet openings at the back end. Filtration of the solid particles, in particular the soot particles, takes place on or in the porous walls, whereby the particles can also collect in the region of the end closure.

The wall-flow filter according to the invention accordingly differs from known wall-flow filters in that it additionally has catalyst channels and the inlet channels and the catalyst channels have common walls and the outlet channels and the catalyst channels likewise have common walls. In this case, it is advantageous that a high gas flow is achieved so that large quantities of exhaust gases can pass from the inlet channels into the catalyst channels and into the outlet channels. This increases the efficiency of the filter.

In a preferred embodiment, the catalyst channels are disposed between the inlet channels and the outlet channels such that the exhaust gases flow from the inlet channels through the catalyst channels into the outlet channels. In this embodiment, it is advantageous that all exhaust gases pass through the catalyst channels. This results in a high catalytic efficiency.

In a preferred embodiment, the inlet channels and the outlet channels have no common walls. This ensures that all exhaust gases pass through the catalyst channels.

In a preferred embodiment, the cross-sectional area of the inlet channels and/or the outlet channels is greater than the cross-sectional area of the catalyst channels. In the context of this application, the terms "cross-section" and "cross-sectional area" refer to sections transversal to the axial direction. With such an embodiment, a particularly efficient filter is obtained since the volume of the flow channels is maximized and the volume of the catalyst channels is minimized. This ratio can be optimized by the person skilled in the art on the basis of the design of the filter which is most advantageous for catalysis and flow conditions. This design makes it possible to save catalyst and to minimize the volume and weight of the filter overall.

In a preferred embodiment, the porous walls of the channels have mean pore diameters <20 µm, preferably <10 µm or <5 µm. The porous walls of the channels preferably have mean pore diameters of 0.1 to 20 µm, in particular between 0.5 and 10 µm or between 1 and 5 µm. The porosity is preferably measured in accordance with ASTM D6761-07 (2012). Filters with such relatively small pore diameters are advantageous because they have a relatively high filtration efficiency and mechanical stability. Such small pore diameters can easily be adjusted according to the invention via the filter material, in particular the ceramic, since the walls do not have to be coated and the gas flow is thus not reduced by the coating.

The catalyst is contained in solid form in the catalyst channels. The catalyst channels are preferably filled with the catalyst in solid form. The catalyst in solid form is preferably not or not only present in the catalyst channels as a coating. Instead, it is preferred that the catalyst is distributed in the interior of the channels. In a preferred embodiment, the catalyst is contained in the form of particles in the catalyst channels. In this case, the catalyst channels can be filled with the catalyst and then closed. This has the advantage that the channels can be filled with the catalyst in a relatively simple manner and relatively uniformly. In addition to the type and quantity of the catalyst, catalytic activity can additionally be adjusted via the particle size, particle shape and particle packing.

Particularly preferably, the catalyst is contained as powder. The powder is preferably free-flowing and therefore usable as bulk material. In this case, it is advantageous that the channels can be filled in a simple manner with the catalyst in solid form. When a powdery catalyst is used, it preferably has a mean particle size of >0.5 µm, preferably >10 µm or >50 µm but less than 100 µm.

The catalyst in the form of particles can, for example, be introduced into the channels by suction by means of negative pressure and/or as part of a suspension or solution.

It is also possible for a plurality of catalysts to be filled into the corresponding channels simultaneously. Thus, a layered arrangement of catalysts can optionally be achieved (layered format) or a zoned arrangement of the catalysts (zoned format) can be provided in the channels. Also possible is the physical mixing of different catalysts, for example, those for NOx reduction and those for the $NH_3$ oxidation.

In a further embodiment, the catalyst may also be present as a block or as granules, for example, in the form of a porous block or a composite material with catalyst particles in a solid matrix.

According to the invention, it is not necessary for the filter to have walls coated with catalyst. Efficient catalysis can be achieved when the catalyst channels are filled in a simple manner with the catalyst in solid form. The filter in one embodiment therefore does not have catalyst-coated walls.

Nevertheless, it is preferred that the filter has catalyst-coated walls in addition to the solid catalyst in the channels. In this case, the walls of the inlet channels, outlet channels and catalyst channels can be coated (layered or zoned format), wherein catalyst in solid form is additionally contained in the interior of the catalyst channels. In this embodiment, it is advantageous on the one hand that the catalytic effect can be increased further and on the other hand that different catalysts may be combined. Catalysts which would not be compatible in a coating can also be combined in this case. It is thus conceivable for a first catalyst to be present in the catalyst channels in solid form with a first selectivity, while the porous walls of the filter are additionally coated with a second catalyst having a second, different specificity. In this way, a particularly efficient filter can be obtained overall which can be adapted particularly well to specific requirements.

The channels can basically have any desired cross-sectional areas, which can be round, rectangular, hexagonal, triangular or ellipsoidal, for example. It is preferred in this case that the channels have a structure that assists an efficient and complete flow of gas from the inlet channels through the catalyst channels into the outlet channels. The channels preferably have an asymmetrical structure overall. This means that not all channels will have the same design.

In a preferred embodiment, the catalyst channels have a triangular or rectangular cross-sectional area. In this case, the cross-sectional areas of the catalyst channels are preferably smaller than the cross-sectional areas of the inlet channels and/or of the outlet channels. In such embodiments, spatial conditions in the filter can be adjusted in an optimum manner so that a particularly compact filter is obtained overall which can also be produced in a relatively simple manner, especially as a ceramic.

In a preferred embodiment, the inlet channels and outlet channels respectively have a hexagonal cross-section and the catalyst channels have a triangular cross-section. In this case, it is advantageous that the channels can be arranged in a particularly space-saving manner and that production can be effected relatively simply.

In a preferred embodiment, the inlet channels, outlet channels and catalyst channels respectively have a rectangular cross-section, wherein the cross-sections of the channels can be different and can be matched to one another. Even in this embodiment, compact filters with optimally adjusted amounts of catalyst can be provided in a simple manner.

The wall-flow filters according to the invention are suitable for cleaning exhaust gases from engines, in particular from diesel engines. Solid particles are filtered out of the exhaust gases via the porous walls. The solid particles are in particular soot particles but also other particles, such as salts, in particular sulfates, or metal ashes. With the catalyst, gaseous exhaust gas components, such as nitrogen oxides (NOx), CO, hydrocarbons or $H_2S$, can be removed by chemical reaction. Comparatively harmless products are obtained thereby, such as $H_2O$, $CO_2$ or $N_2$. The catalyst can also be designed such that it degrades filtered particles, in particular soot particles, by chemical reaction. The catalyst may also be selected so as to store undesirable substances. The general function of such filters and the underlying chemical and physical processes are known to the person skilled in the art and are described, for example, in van Setten et al., "Science and Technology of Catalytic Diesel Particulate Filters," 2001, Catalysis Reviews 43(4), 489-564.

According to the invention, conventional filter materials and catalysts can be used in the prior art. The wall-flow filters according to the invention can thus contain catalysts which are contained in the prior art in coatings of particle filters with an oxidation catalyst (CDPF), particle filters with an SCR coating (SDPF; SCR=selective catalytic reduction), particle filters with NOx storage reduction catalysts (NDPF) or particle filters with three-way catalysts (OPF).

The filter itself can consist of materials customary for wall-flow filters and can be produced by customary methods. In the prior art, filters made of ceramic or metal are in particular used, ceramic filters being the most widely used for automotive applications. Preferred ceramic materials are cordierite, silicon carbide, silicon nitride, α-aluminum oxide, zirconium, zirconium phosphate, aluminum titanate, mullite, spodumen, alumina-silica-magnesia or zirconium silicate. Such filters are preferably used as monoliths, i.e. as a one-piece ceramic. Embodiments with walls made of fiber materials are alternatively also possible. Monoliths of cordierite, aluminum titanate or silicon carbide are particularly preferably used. Wall-flow filters based on ceramics and other materials and methods for their production are known in the prior art. By way of example, reference is made to WO 2005/016497A1, to EP 1 776 994 A1 or to Majewski, "Wall-Flow Monoliths," 2005, www.DieselNet.com, Ecopoint Inc. Revision 2005.09b.

Producing the filters and adjusting the porosity can be effected by known methods. According to the invention, it is advantageous that the porosity does not have to be laboriously adjusted to the quantity of the coating. According to the invention, the porosity of the filter walls essentially has to be adjusted, which considerably simplifies the production process. It is particularly advantageous that a specific ceramic with a defined porosity—with or without a catalyst coating—can be filled without further ado with various solid catalysts without significantly changing the porosity. Particularly if the gas flow is not reduced by a coating, filters with very fine pores in the range of <10 μm can be used.

Catalysts used are preferably those having a storage function for NOx, $NH_3$, $O_2$, hydrocarbons, $H_2S$ or SOx.

The wall-flow filter preferably has a housing in which the filter component with the catalyst is inserted. Such housings are usually made of steel. In this case, the filter can contain conventional connecting means or other devices, such as means for reducing vibrations or for supplying reagents.

The invention also relates to a method for producing the wall-flow filter according to the invention, comprising the steps:
(a) Providing a wall-flow filter having parallel exhaust gas inlet channels and exhaust gas outlet channels which are closed at alternate ends, and having additional catalyst channels closed at one end,
(b) Providing the catalyst,
(c) Introducing the catalyst into the catalyst channels, and
(d) Closing the catalyst channels at the back end.

In step (a), a wall-flow filter is provided in which the catalyst channels are not yet filled with the catalyst in solid form. The wall-flow filter may be coated, wherein the catalyst channels may also be coated. In step (b), the catalyst for filling the catalyst channels is provided. In this case, it is preferred that the catalyst is provided in solid form and introduced into the catalyst channels. The catalyst is provided in a suitable consistency in order to enable uniform and complete filling of the catalyst channels. This can be done, for example, with a free-flowing powdery catalyst which can be sucked in by reduced pressure. The catalyst may also be provided in the form of a suspension or solution, wherein the liquid component is removed after the channels have been filled. After a desired quantity of the catalyst has been introduced into the catalyst channels, they are also closed at the opposite end. The catalyst channels are then closed at both ends and the catalyst can no longer escape from the filter. Optionally, a cleaning step (e) follows, in which the filter is cleaned, wherein in particular undesired catalyst residues are removed from the exhaust gas inlet channels and exhaust gas outlet channels. Optionally, an after-treatment step (f) takes place, wherein the catalyst is after-treated, for example, sintered or dried.

The invention also relates to the use of the wall-flow filter according to the invention for cleaning exhaust gases from combustion processes, in particular from engines, such as diesel engines or gasoline engines. It is used in particular as a soot particle filter, wherein preferably at least one gaseous component of the exhaust gases is depleted. This application is in particular for motor vehicles.

The wall-flow filter according to the invention can be combined with further devices customary in the prior art in order to ensure or improve exhaust gas cleaning. Thus, further filter or catalyst devices can be combined or devices for admixing reagents, such as HC, $NH_3$ or urea solution, can be connected.

The design of the wall-flow filter according to the invention is explained below, by way of example and schematically, on the basis of FIGS. 1 to 3.

Figure 1:
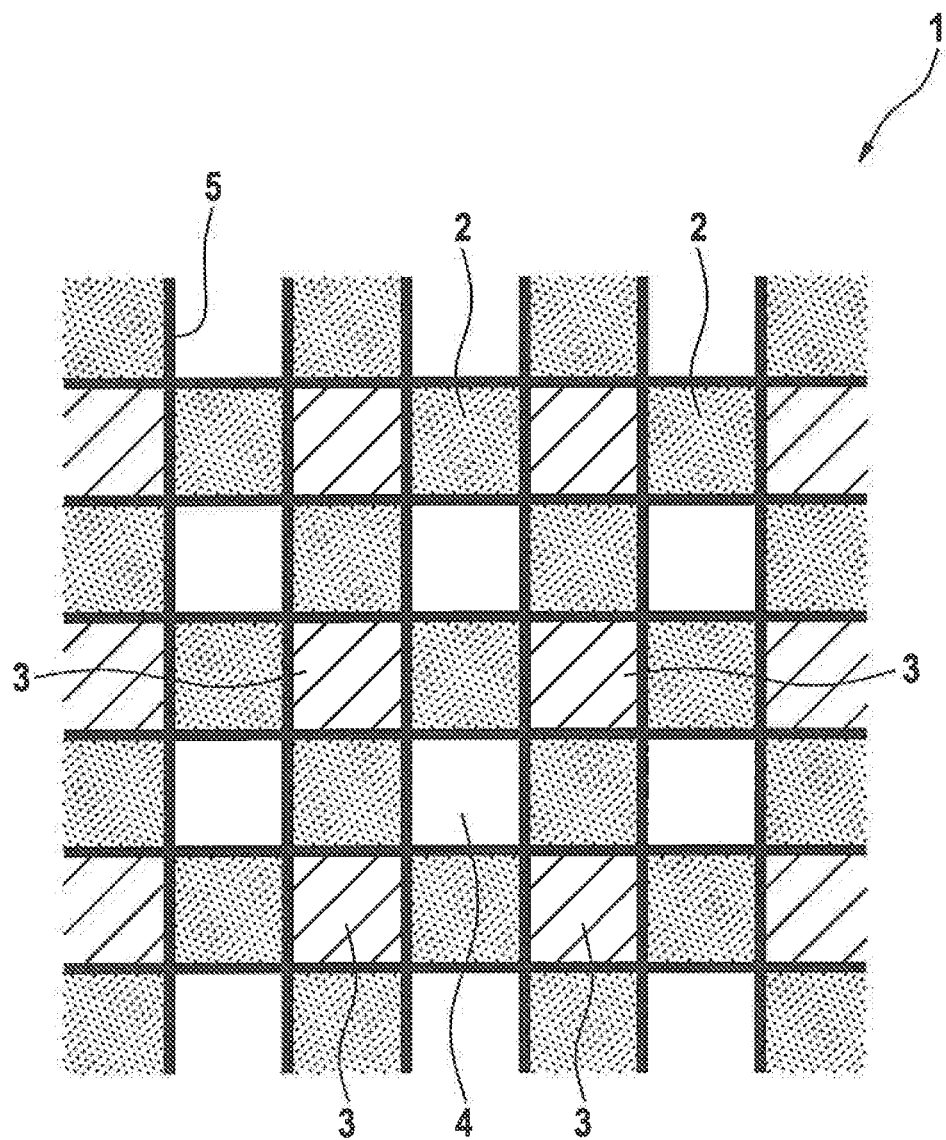
FIG. 1 shows, by way of example and schematically, a wall-flow filter according to the invention in cross-section with catalyst channels (dark), exhaust gas inlet channels (cross-hatched) and exhaust gas outlet channels (light).

FIG. 1 shows a wall-flow filter 1 according to the invention in cross-section. The catalyst channels 2, exhaust gas inlet channels 3 and exhaust gas outlet channels 4 have square cross-Jo sections of equal size. The channels are separated from each other by common porous walls 5. Each inlet channel 3 and outlet channel 4 is connected via common walls to four catalyst channels 2. As a result, almost all exhaust gases can only reach an outlet channel when they have first passed through a catalyst channel. Only at the corners of the squares is there a small direct contact between an inlet channel and an outlet channel. However, if the wall-flow filter has sufficiently thin walls, the amount of gas that passes from an exhaust gas inlet channel into an exhaust gas outlet channel via the corners is negligible. An additional catalytic effect can also be achieved with a catalytic coating. The embodiment according to FIG. 1 with square channels of identical size is advantageous since production of the filters is relatively easy and since the mechanical stability is relatively high due to the uniform distribution of the structural elements. Since the catalyst channels are relatively large, it may be preferred in this embodiment to adjust the catalytic activity by admixing an inert carrier material.

Figure 2:
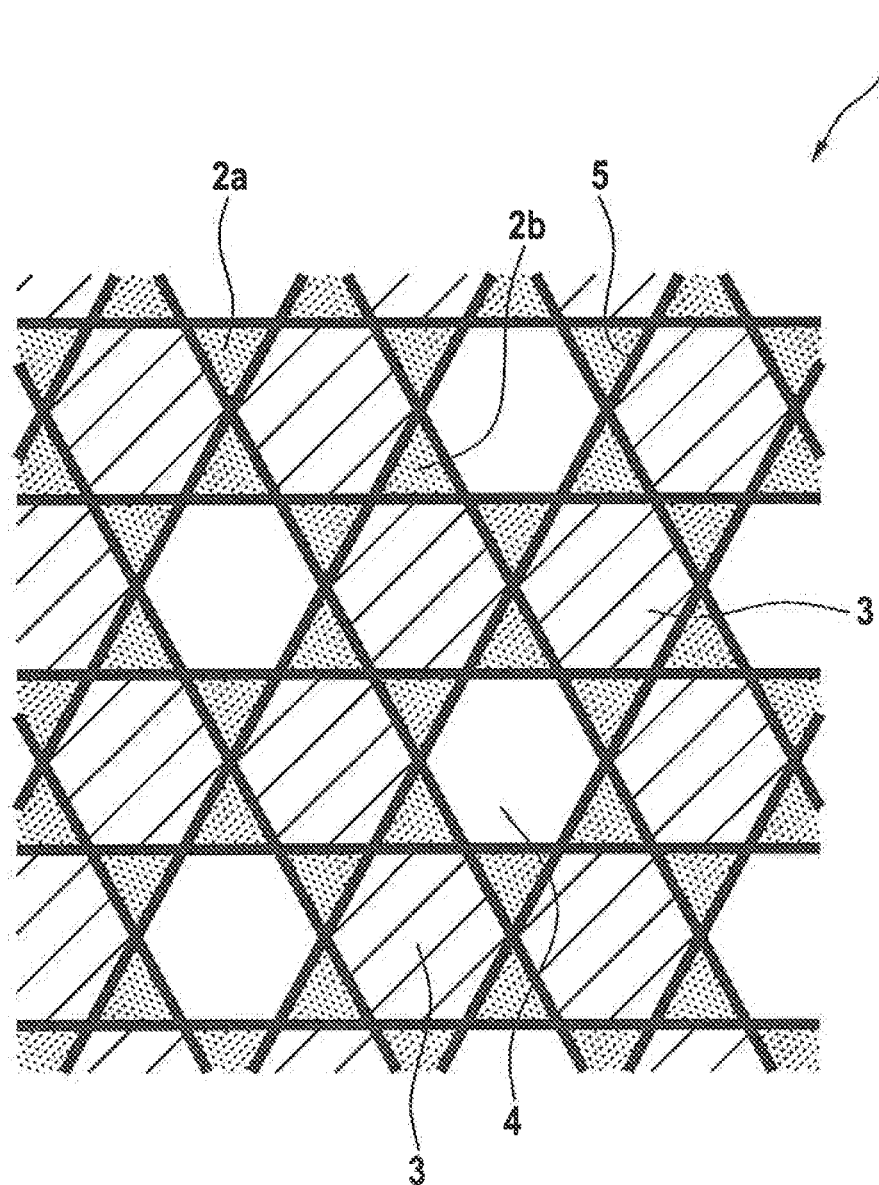
FIG. 2 shows, by way of example and schematically, a wall-flow filter according to the invention with hexagonal inlet channels (cross-hatched) and outlet channels (light) and triangular catalyst channels (dark).

FIG. 2 shows a wall-flow filter 1 with hexagonal inlet channels 3 and hexagonal outlet channels 4. The catalyst channels 2a and 2b are triangular and may be of different sizes. Each hexagonal inlet channel and each hexagonal outlet channel is connected via the six side walls only to catalyst channels. This ensures that the exhaust gases flow from the inlet channels through the catalyst channels into the outlet channels.

Figure 3:
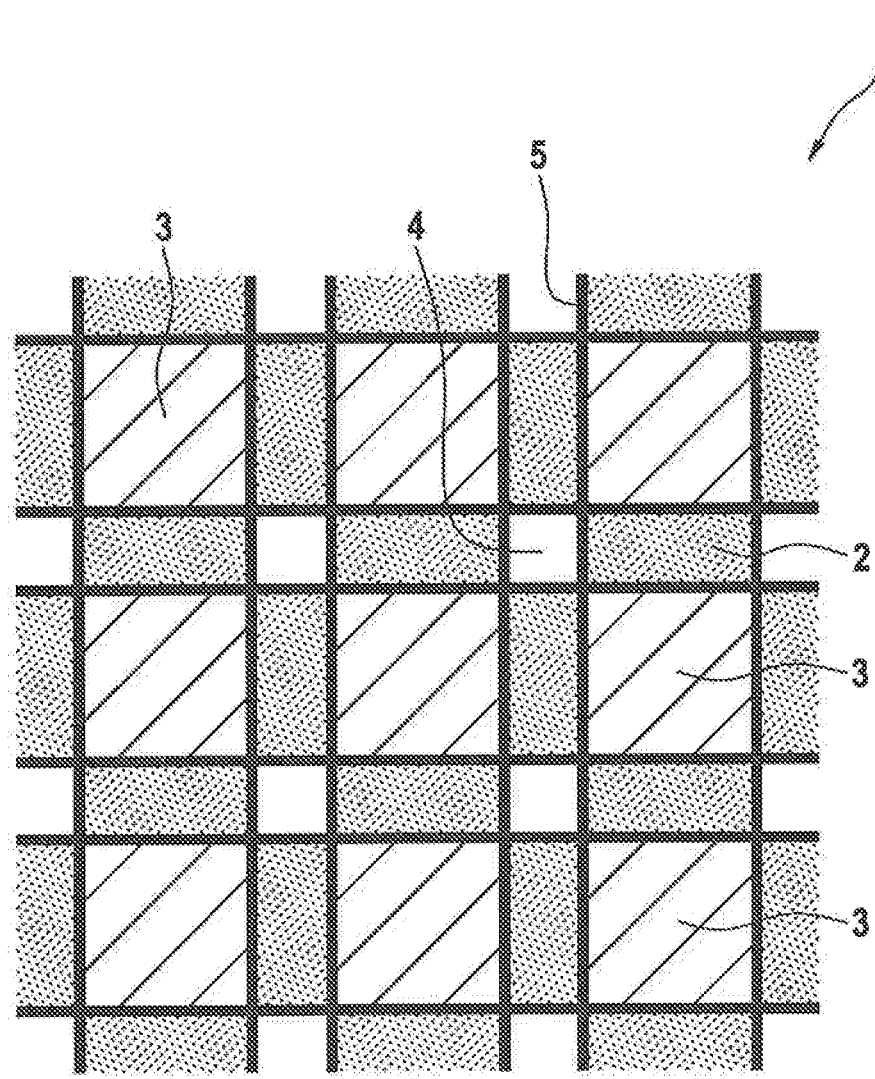
FIG. 3 shows, by way of example and schematically, a wall-flow filter according to the invention with rectangular catalyst channels (dark), exhaust gas inlet channels (cross-hatched) and exhaust gas outlet channels (light).

FIG. 3 shows a wall-flow filter 1 according to the invention with rectangular channels. Square inlet channels 3 and larger square outlet channels 4 are shown merely by way of example. The inlet channels 3 and outlet channels 4 are connected via the common walls 5 only to the rectangular, elongate catalyst channels 2. Such embodiments have the advantage that the catalyst channels are smaller and that catalyst material can be saved or used in a space-saving and volume-saving manner. Alternatively, alternative embodiments are possible, for example, with larger square inlet channels and smaller square outlet channels.

The wall-flow filters, methods and uses according to the invention achieve the above-described aim. According to the invention, simple, improved wall-flow filters are provided which have a high catalytic activity. The filters have good filter properties and a high mechanical stability, enabling a high gas flow in a compact design. According to the invention, simplified methods for producing wall-flow filters are also provided, wherein the use of different catalysts in relatively large quantities is made possible. With regard to the requirements, various catalyst materials can be used, varied or combined with little effort without impairing the porosity.

The invention claimed is:

1. Wall-flow filter (1) for cleaning exhaust gases from engines, comprising parallel exhaust gas inlet channels (3) and exhaust gas outlet channels (4) which are closed at alternate ends, wherein the filter additionally comprises catalyst channels (2) which are closed at both ends and contain a catalyst in solid form, and wherein the inlet channels (3) and the catalyst channels (2) have common walls and wherein the outlet channels (4) and the catalyst channels (2) have common walls (5).

2. Filter according to claim 1, wherein the catalyst channels (2) are disposed between the inlet channels (3) and the outlet channels (4) so that the exhaust gases flow from the inlet channels (3) through the catalyst channels (2) into the outlet channels (4).

3. Filter according to claim 1, wherein the inlet channels (3) and the outlet channels (4) have no common walls (5).

4. Filter according to claim 1, wherein the cross-sectional area of the inlet channels (3) and/or of the outlet channels (4) is larger than the cross-sectional area of the catalyst channels (2).

5. Filter according to claim 1, wherein the porous walls of the channels have mean pore diameters <20 μm.

6. Filter according to claim 1, wherein the catalyst is contained in the catalyst channels (2) in the form of particles.

7. Filter according to claim 1, wherein the walls (5) are additionally coated with catalyst.

8. Filter according to claim 1, wherein the catalyst channels (2) have a triangular or rectangular cross-section.

9. Filter according to claim 1, wherein the inlet channels (3) and outlet channels (4) respectively have a hexagonal cross-section and the catalyst channels (2) have a triangular cross-section.

10. Filter according to claim 1, wherein the inlet channels (3), outlet channels (4) and catalyst channels (2) respectively have a rectangular cross-section.

11. Method for producing a wall-flow filter according to claim 1, comprising the steps:
(a) providing a wall-flow filter having parallel exhaust gas inlet channels (3) and exhaust gas outlet channels (4) which are closed at alternate ends, and having additional catalyst channels (2) closed at one end,
(b) providing the catalyst,
(c) introducing the catalyst into the catalyst channels (2), and
(d) closing the catalyst channels (2) at the back end.

12. A method of cleaning exhaust gas from on engine, comprising: introducing the exhaust gas to the wall-flow filter according to claim 1.

13. The method of claim 12 wherein the engine is a diesel engine.

* * * * *